US011443131B2

(12) United States Patent
Higuchi et al.

(10) Patent No.: US 11,443,131 B2
(45) Date of Patent: Sep. 13, 2022

(54) SYSTEMS AND METHODS FOR CREATING A PARKING MAP

(71) Applicant: Toyota Motor Engineering & Manufacturing North America, Inc., Plano, TX (US)

(72) Inventors: Takamasa Higuchi, Mountain View, CA (US); Kentaro Oguchi, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 188 days.

(21) Appl. No.: 16/879,239

(22) Filed: May 20, 2020

(65) Prior Publication Data

US 2021/0365721 A1 Nov. 25, 2021

(51) Int. Cl.
*G06K 9/62* (2022.01)
*G06K 9/52* (2006.01)
*G06K 9/00* (2022.01)
*G06K 9/20* (2006.01)
*G06V 10/22* (2022.01)
*G06V 10/42* (2022.01)
*G06V 20/52* (2022.01)

(52) U.S. Cl.
CPC ........... *G06K 9/6218* (2013.01); *G06V 10/22* (2022.01); *G06V 10/42* (2022.01); *G06V 20/52* (2022.01)

(58) Field of Classification Search
CPC ...... G06K 9/6218; G06V 10/22; G06V 10/26; G06V 10/42; G06V 20/52
See application file for complete search history.

(56) References Cited

U.S. PATENT DOCUMENTS

| 10,078,789 | B2 | 9/2018 | Gupta et al. |
| 2018/0095474 | A1 | 4/2018 | Batur et al. |
| 2018/0232583 | A1 | 8/2018 | Wang et al. |
| 2018/0232584 | A1 | 8/2018 | Pathangay et al. |
| 2018/0301031 | A1 | 10/2018 | Naamani et al. |
| 2019/0130182 | A1 | 5/2019 | Zang et al. |
| 2019/0318179 | A1* | 10/2019 | Jiang .................... G06V 20/647 |
| 2020/0090516 | A1 | 3/2020 | Sert et al. |

FOREIGN PATENT DOCUMENTS

WO 2019166559 A1 9/2019

\* cited by examiner

*Primary Examiner* — Michael J Vanchy, Jr.
(74) *Attorney, Agent, or Firm* — Christopher G. Darrow; Darrow Mustafa PC

(57) ABSTRACT

A method of creating a parking facility map includes obtaining one or more images of a parking facility, generating an estimate map of parking spaces in the parking facility based at least on the one or more images (the estimate map of parking spaces includes a plurality of estimate parking space shapes), identifying a parking block that includes a cluster of estimate parking spaces among the plurality of estimate parking space shapes, determining a common geometric pattern among the cluster of estimate parking spaces, correcting geometrical features of one or more estimate parking spaces in the cluster of estimate parking spaces based at least in part on the common geometric pattern, identifying one or more gaps among the cluster of estimate parking space shapes, and determining a number of inserted parking spaces to fill the one or more gaps based at least in part on the common geometric pattern.

20 Claims, 7 Drawing Sheets

SYSTEMS AND METHODS FOR CREATING A PARKING MAP

TECHNICAL FIELD

The subject matter described herein relates to systems and methods for creating a parking lot map, and, more particularly, to generating an estimate map for a parking facility and mitigating errors in the estimate parking map based at least in part on detecting common patterns among parking spaces in the estimate parking map to create a corrected, accurate parking map for the parking facility.

BACKGROUND

High definition (HD) maps of parking facilities or parking lots are often an essential component of intelligent parking solutions. Accurate information about locations of each parking space can serve as a foundation for a variety of advanced services, such as navigation directly to available parking spaces (as opposed to navigation to a parking lot in general) and automated valet parking. However, manually creating accurate HD parking maps can require a prohibitive amount of human labor. Furthermore, manually creating accurate HD parking maps that correspond to parking facilities across a wide geographical region is a difficult and excessively time-consuming task.

SUMMARY

In one embodiment, example systems and methods associated with creating a parking map by generating an estimate HD parking map and correcting errors contained therein are disclosed.

For example, a parking facility mapping system is disclosed. In one approach, the disclosed system includes one or more processors and a memory communicably connected to the one or more processors. The memory can store an image module including one or more instructions that, when executed by the one or more processors, cause the one or more processors to obtain one or more images of a parking facility. The memory can further store an estimate module including one or more instructions that, when executed by the one or more processors, cause the one or more processors to generate an estimate map of parking spaces in the parking facility based at least on the one or more images. The estimate map of parking spaces can include a plurality of estimate parking space shapes.

The memory can further store a correction module including one or more instructions that, when executed by the one or more processors, cause the one or more processors to identify a parking block that includes a cluster of estimate parking spaces among the plurality of estimate parking space shapes, determine a common geometric pattern among the cluster of estimate parking spaces, correct geometrical features of one or more estimate parking spaces in the cluster of estimate parking spaces based at least in part on the common geometric pattern, identify one or more gaps among the cluster of estimate parking spaces, and determine a number of inserted parking spaces to fill the one or more gaps based at least in part on the common geometric pattern to create a corrected map of parking spaces of the parking facility.

In one embodiment a method of creating a map of a parking facility is disclosed. The method includes obtaining one or more images of a parking facility, generating an estimate map of parking spaces in the parking facility based at least on the one or more images, the estimate map of parking spaces including a plurality of estimate parking space shapes, identifying a parking block that includes a cluster of estimate parking spaces among the plurality of estimate parking space shapes, determining a common geometric pattern among the cluster of estimate parking spaces, correcting geometrical features of one or more estimate parking spaces in the cluster of estimate parking spaces based at least in part on the common geometric pattern, identifying one or more gaps among the cluster of estimate parking spaces, and determining a number of inserted parking spaces to fill the one or more gaps based at least in part on the common geometric pattern.

In one embodiment, a non-transitory computer-readable medium is disclosed. The computer-readable medium stores instructions that when executed by one or more processors cause the one or more processors to perform the disclosed functions. The instructions include instructions to obtain one or more images of a parking facility, generate an estimate map of parking spaces in the parking facility based at least on the one or more images, the estimate map of parking spaces including a plurality of estimate parking space shapes, identify a parking block that includes a cluster of estimate parking spaces among the plurality of estimate parking shapes, determine a common geometric pattern among the cluster of estimate parking spaces, correct geometrical features of one or more estimate parking spaces in the cluster of estimate parking spaces based at least in part on the common geometric pattern, identify one or more gaps among the cluster of estimate parking spaces, and determine a number of inserted parking spaces to fill the one or more gaps based at least in part on the common geometric pattern.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
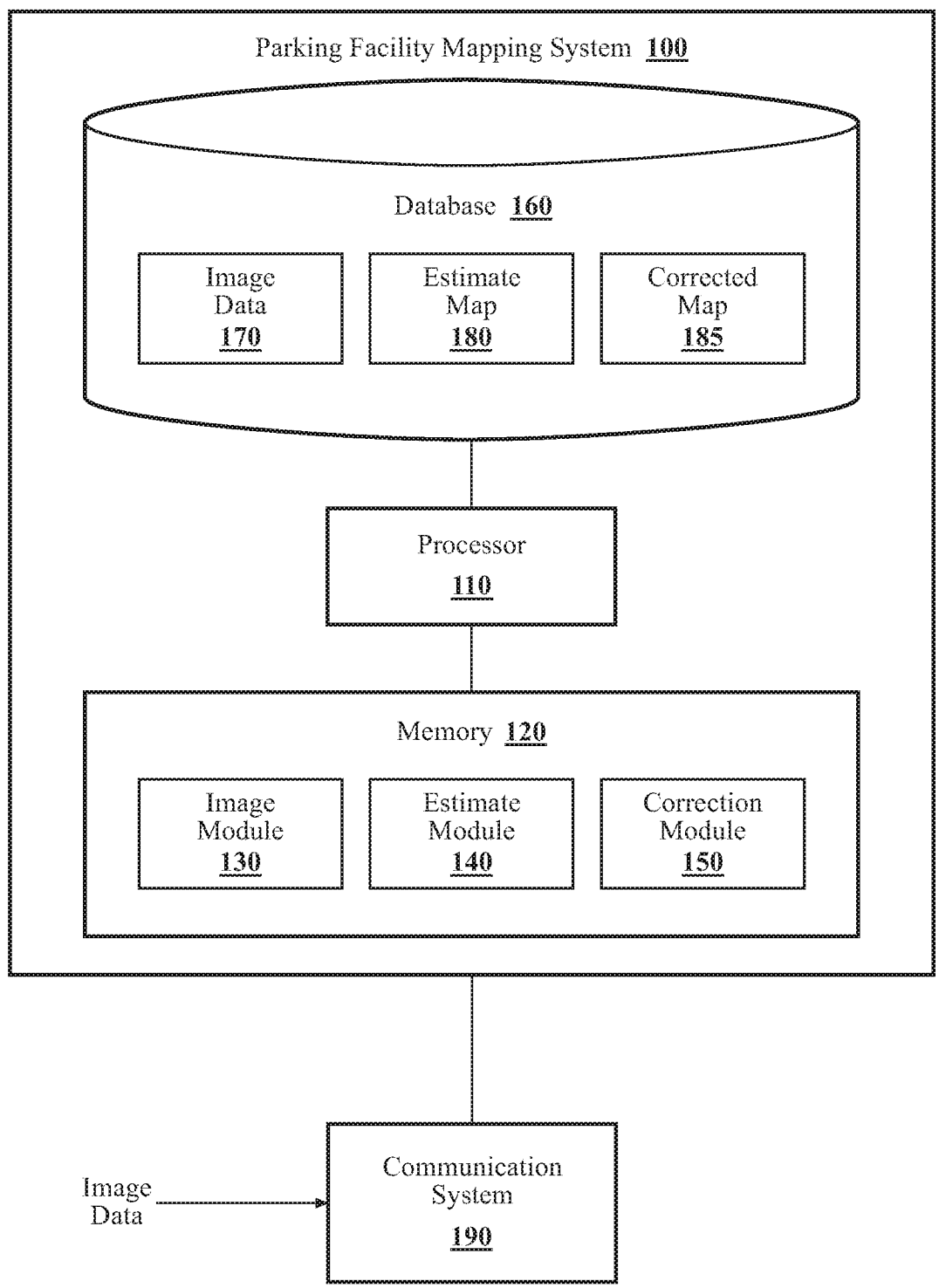
FIG. 1 illustrates one embodiment of a parking facility mapping system according to the disclosed subject matter.

Systems, methods and embodiments associated with creating an HD map of a parking facility are disclosed. Herein, the term "parking facility" refers to an area having designated and marked parking spaces dedicated for the parking of a plurality of vehicles, e.g., a parking lot, a street or area with a plurality of parking spaces, etc. Parking facilities may be present, for example, at malls, stadiums, churches, urban/suburban areas, apartments, theatres and the like.

In one or more embodiments, the disclosed parking facility mapping system obtains one or more images of a parking facility (or multiple parking facilities across a region). The images can be HD images received, for example, from satellite imagery, one or more vehicles, such as cars or unmanned aerial vehicles (UAV) equipped with imaging devices that travel in and/or around the parking facility and capture images of the parking facility, stationary network-connected cameras, or other imaging means. In one or more embodiments, the images can include associated location information (e.g., GPS coordinates) that indicates a geographical location associated with the images.

The parking facility mapping system can generate an estimate parking map based on the images. For example, in one or more embodiments the parking facility mapping system can use digital image processing and feature extraction techniques (e.g., Hough transform) to identify and extract line segments that can roughly correspond to parking space line markers, or use conventional techniques to extract parking lines and estimate the positions of parking spaces in the images. The parking facility mapping system can generate an estimate parking map based on the extracted parking lines.

However, utilizing conventional digital image processing and feature extraction to generate a parking map often results in a significant number of errors that render the map too inaccurate for high-precision use. For example, the size and shape of detected parking spaces may be inaccurate (e.g., parked cars, trees, shadows, etc., may partially occlude parking space lines), entire parking spaces may be missed due to occlusion (e.g., parked cars and shadows may occlude entire parking space lines), geographical locations of parking spaces cannot be estimated, etc.

Accordingly, the disclosed parking facility mapping system can execute corrective measures to improve the accuracy of the estimate parking map and create a corrected parking map. For example, as will be discussed below, in one or more embodiments the parking facility mapping system can adjust the geometry of parking spaces in the estimate parking map based on spatial patterns, interpolate/extrapolate missing parking spaces based on spatial patterns, and combine positioning information with error correction based on spatial patterns to accurately estimate locations of parking spaces to create a corrected parking map of the parking facility with a high degree of accuracy suitable for precision use.

Referring to FIG. 1, one embodiment of a parking facility mapping system 100 is illustrated. While arrangements will be described herein with respect to the parking facility mapping system 100, it will be understood that embodiments are not limited to a unitary system as illustrated. In some implementations, the parking facility mapping system 100 may be embodied as a cloud-computing system, a cluster-computing system, a cloud server, an edge sever, a distributed computing system (e.g., across multiple facilities), a software-as-a-service (SaaS) system, and so on. Accordingly, the parking facility mapping system 100 is illustrated and discussed as a single system for purposes of discussion but should not be interpreted to limit the overall possible configurations in which the disclosed components may be configured. For example, the separate modules, memories, databases, and so on that will be discussed below may be distributed among various computing systems in varying combinations.

The parking facility mapping system 100 is shown including various elements. It will be understood that in various embodiments and configurations depending on the actual layout and implementation, it may not be necessary for the parking facility mapping system 100 to have all of the elements shown in FIG. 1. The parking facility mapping system 100 can have any combination of the various elements shown in FIG. 1. Further, the parking facility mapping system 100 can have additional elements to those shown in FIG. 1. In some arrangements, the parking facility mapping system 100 may be implemented without one or more of the elements shown in FIG. 1. Further, while the various elements are shown as being located within the parking facility mapping system 100 in FIG. 1, it will be understood that one or more of these elements can be located external to the parking facility mapping system 100. In addition, the elements shown may be physically separated by large distances.

It will also be appreciated that for simplicity and clarity of illustration, where appropriate, reference numerals have been repeated among the different figures to indicate corresponding or analogous elements. The discussion outlines numerous specific details to provide a thorough understanding of the embodiments described herein. Those of skill in the art, however, will understand that the embodiments described herein may be practiced using various combinations of these elements.

In any case, the parking facility mapping system 100 is implemented to perform methods and other functions as disclosed herein relating to generating an estimate parking map and correcting the estimate parking map to create a corrected parking map. The noted functions and methods to achieve this will become more apparent with a further discussion of the figures.

The parking facility mapping system 100 is shown including a processor 110, a memory 120, database 160, and a communication system 190. In various implementations the processor 110 may be a part of the parking facility mapping system 100, the parking facility mapping system 100 may access the processor 110 through a data bus or another communication pathway, the processor 110 may be a remote computing resource accessible by the parking facility mapping system 100, and so on. In any case, the processor 110 is an electronic device such as a microprocessor, an ASIC, or another computing component that is capable of executing machine-readable instructions to produce various electronic outputs therefrom that may be used to control or cause the control of other electronic devices.

The parking facility mapping system 100 includes a memory 120 that stores, for example, an image module 130, an estimate module 140, and a correction module 150. The memory 120 may store additional components as required per implementation. The memory 120 can be implemented as a random-access memory (RAM), a read-only memory (ROM), a hard-disk drive, a flash memory, or other suitable memory for storing the modules 130, 140 and 150.

The modules 130, 140 and 150 are, for example, computer-readable instructions that when executed by the processor 110 cause the processor 110 to perform the various functions disclosed herein. In various embodiments, the modules 130, 140 and 150 can be implemented in different forms that can include but are not limited to hardware logic, an ASIC, components of the processor 110, instructions embedded within an electronic memory, and so on. The modules 130, 140 and 150 will be discussed in greater detail further below.

The parking facility mapping system 100 includes a data store, which may be implemented as the database 160. The database 160 is, in one or more embodiments, an electronic data structure that can be a data store integral with the parking facility mapping system 100, a removable memory device that can be installed in or removed from the parking facility mapping system 100, or a network-based data store that is accessible to the modules 130, 140 and 150 stored in the memory 120. In one or more embodiments the database 160 can be accessible to external systems, such as cloud or edge servers, vehicles, or road-side units. The database 160 is configured with routines that can be executed by the processor 110 for analyzing stored data, accessing and providing stored data, organizing stored data, and so on. Thus, in one embodiment, the database 160 stores and manages/updates data, such as image data 170, estimate map data 180 and corrected map data 185, as well as other types of data that are used by modules 130, 140 and 150 in executing various functions.

The parking facility mapping system 100 can also include a communication system 190 that allows the parking facility mapping system 100 to receive image data and communicate, for example, with communication networks, vehicle systems, mobile computing devices, and other systems that may have a need for a parking facility map or may contribute to creating a parking facility map. The communication system 190 can be implemented, for example, as a wireless communication system including one or more transmitting/receiving devices, one or more transmitting/receiving antennas and a controller for transmitting and receiving data over a wireless network using any of a variety of protocols, such as vehicle-to-everything (V2X), general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), Wibree, and/or any other wireless protocol. In one or more embodiments, the communication system 190 can be configured to receive, for example, image data 170 from one or more external entities, such as various vehicles, stationary cameras, satellites, etc.

The modules 130, 140 and 150 can be, for example, constructed as computer-readable instructions that when executed by the processor 110 cause the processor 110 to perform the various functions disclosed herein.

The image module 130 generally includes instructions that function to control the processor 110 to obtain one or more images of a parking facility. The image module 130 can communicate, for example, with an external system via the communication system 190 to request images associated with a location of the parking facility. The image module 130 can further include instructions that can control the processor 110 to perform basic image editing functions, such as cropping and stitching together multiple images to form a single, more complete image of the parking facility.

The estimate module 140 generally includes instructions that function to control the processor 110 to generate an estimate map of parking spaces in the parking facility based at least on the one or more images. The estimate map of parking spaces includes a plurality of estimate parking space shapes, some of which may include errors in terms of size, shape, orientation, missing spaces, etc. The estimate module 140 can include instructions to execute image processing and line extraction techniques to generate the estimate map of parking spaces.

The correction module 150 generally includes instructions that function to control the processor 110 to process the estimate map of parking spaces and create a corrected parking map. For example, in one or more embodiments the correction module 150 can include instructions to analyze the estimate map and identify a parking block that includes a cluster of estimate parking spaces, determine a common geometric pattern among the cluster of estimate parking spaces, and correct geometrical features of one or more estimate parking spaces in the cluster of estimate parking spaces based at least on the common geometric pattern. The correction module 150 can further include instructions to identify one or more gaps among the cluster of estimate parking spaces and determine a number of fill-in parking spaces to fill the one or more gaps based at least in part on the common geometric pattern. By executing corrections such as these, where appropriate, the correction module 150 can create an accurate, corrected map of parking spaces of the parking facility.

Figure 2:
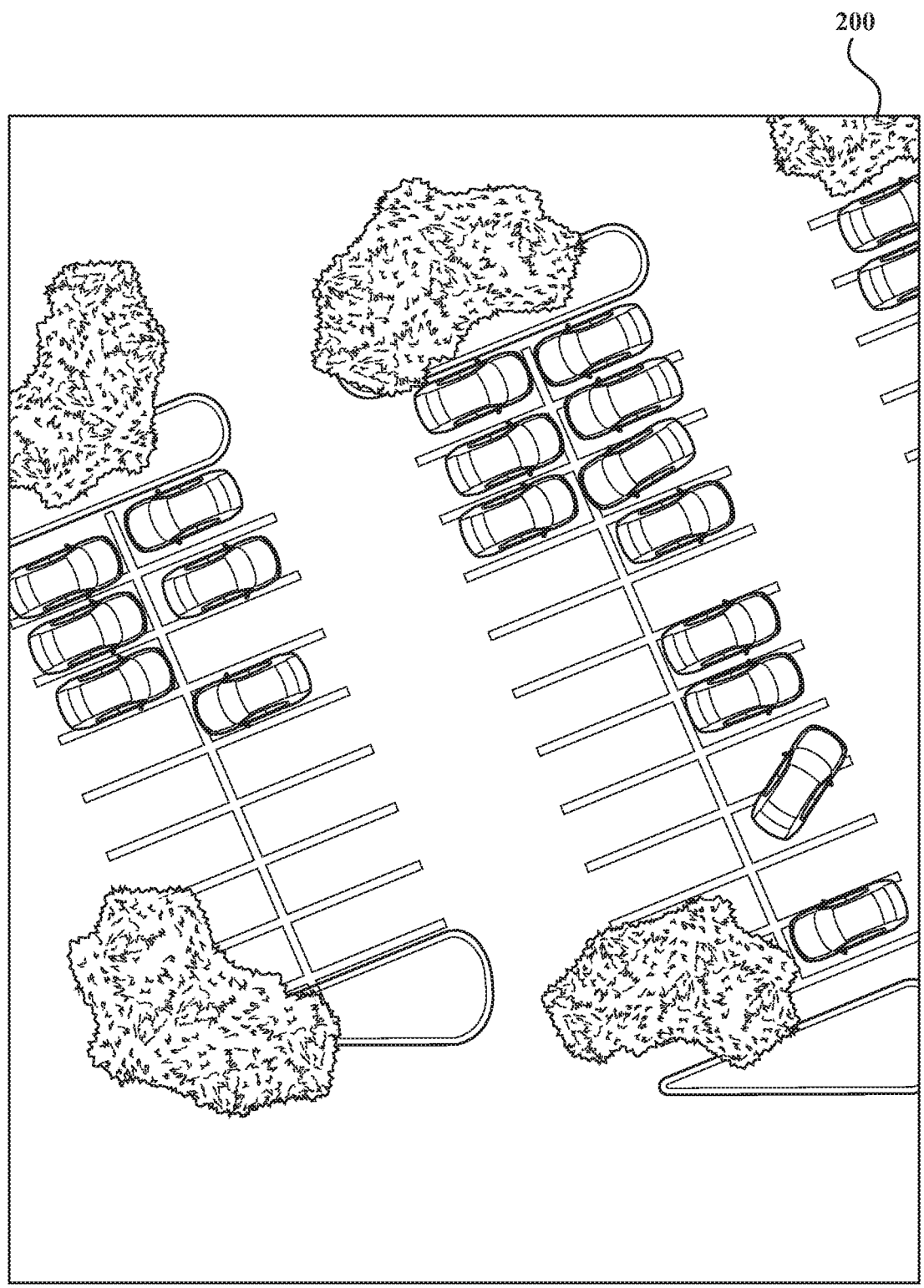
FIG. 2 illustrates an example image of a parking facility that can be mapped by a parking facility mapping system according to the disclosed subject matter.

FIG. 2 shows an example parking facility image 200, in this case, an overhead view of a section of a parking facility. The parking facility mapping system 100 (e.g., image module 130) can obtain an image such as the parking facility image 200, for example, from satellite imagery, a map database, or from a UAV. In some embodiments, the parking facility mapping system 100 may obtain ortho imagery data, that is, a set of aerial or satellite images geometrically corrected such that pixels have a uniform scale. Each pixel in the ortho imagery data can be associated with a corresponding geographical coordinate (e.g., latitude, longitude and altitude). Furthermore, in one or more embodiments participating network-connected vehicles can capture images of a parking facility while passing through the parking facility and transmit the images to the parking facility mapping system 100. Similarly, stationary cameras installed in or near the parking facility can capture images of the parking facility and transmit the images to the parking facility mapping system 100. In any case, in one or more embodiments the parking facility mapping system 100 (e.g., image module 130) can obtain multiple images and stitch them together to form an image of the parking facility.

Figure 3:
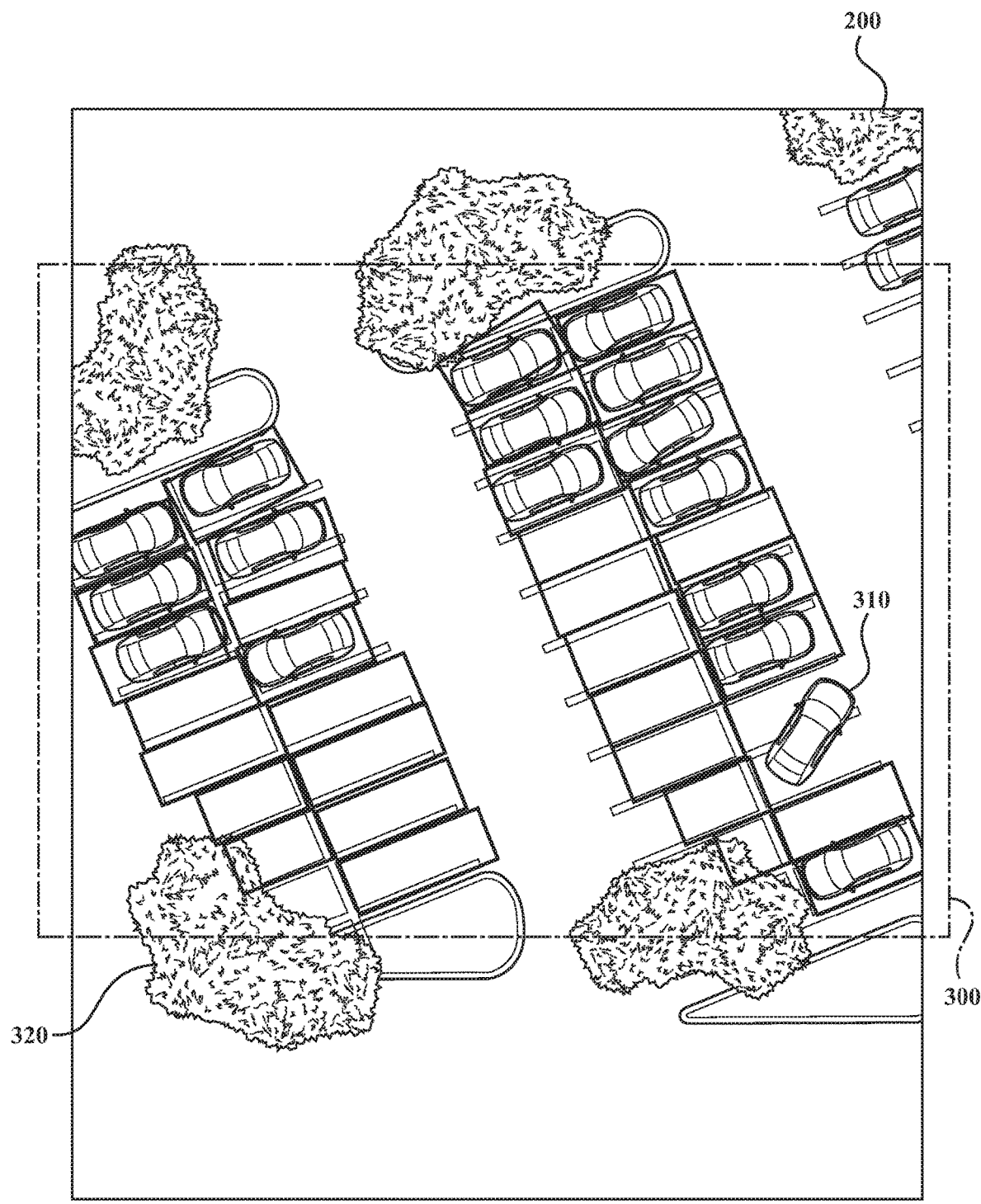
FIG. 3 illustrates an example estimate parking map of the parking facility according to the disclosed subject matter.

The parking facility mapping system 100 (e.g., estimate module 140) can process the parking facility image 200 to generate an estimate parking map. FIG. 3 shows an example estimate parking map 300 generated based on the parking facility image 200.

In one or more embodiments, to generate the estimate parking map 300 the parking facility mapping system 100 (e.g., estimate module 140) can apply an image processing algorithm or a trained machine learning algorithm to the image 200 to detect pixels, for example, based on color, contrast or value, that correspond to parking space lines. The parking facility mapping system 100 (e.g., estimate module 140) can generate the estimate parking map 300 indicating estimate parking spaces based on the identified parking space lines. For images that include corresponding geographical coordinates (e.g., ortho imagery data), the parking facility mapping system 100 can further identify geographical coordinates of the estimate parking spaces based on the embedded location data.

In addition, in some embodiments the parking facility mapping system 100 (e.g., estimate module 140) can employ parking space detection by vehicular sensing. Connected, participating vehicles can detect line markers of the surrounding parking spaces using on-board sensors (e.g., cameras, lidars, etc.), and transmit the estimated relative positions of these detected parking spaces to the parking facility mapping system 100, along with the vehicles' own position and orientation (e.g., measured by GPS and or inertial sensors). Based on the received parking space data and the vehicle position information, the parking facility mapping system 100 may roughly estimate the locations of the detected parking spaces.

Moreover, the parking facility mapping system 100 may use any conventional parking space detection mechanisms or combination thereof to detect the estimate parking spaces in the parking facility image 200 and generate the estimate parking map 300.

In any case, the estimate parking map 300 may include erroneous and/or missing parking spaces, for example, due to occlusions from various sources. For example, the vehicle 310 is incorrectly parked and is occluding a parking line, resulting in an incorrect gap in the estimate parking map 300. In another example, the shadow from a tree 320 occludes portions of multiple parking spaces, resulting in the estimate parking map 300 mischaracterizing the shapes of several parking spaces and not detecting at least one parking space.

Figure 4:
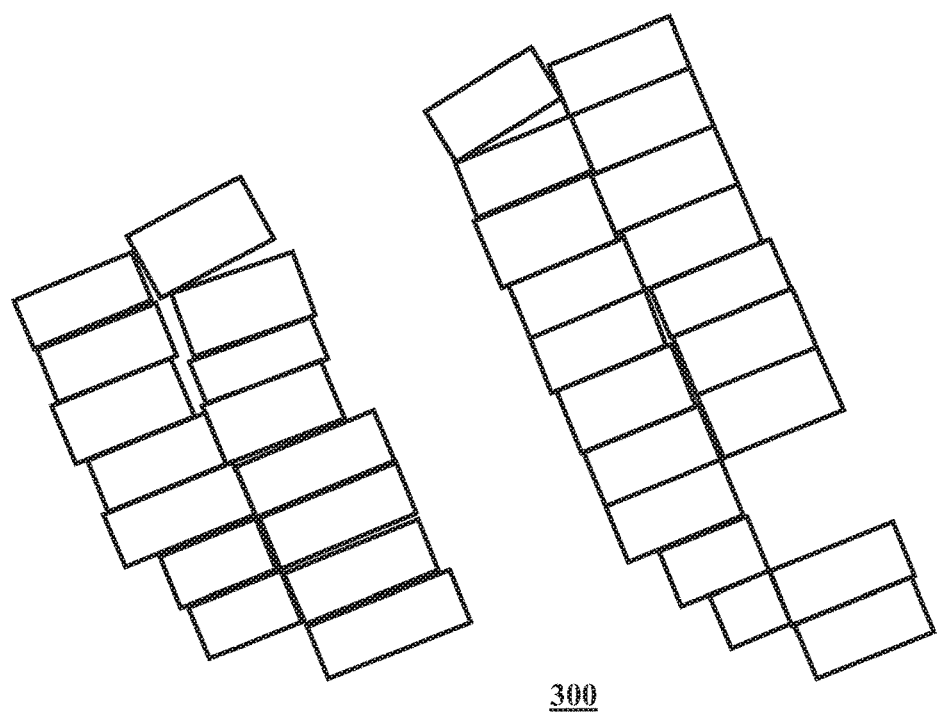
FIG. 4 illustrates an example estimate parking map extracted from the parking facility image before correction according to the disclosed subject matter.

The parking facility mapping system 100 (e.g., correction module 150) can execute several steps to detect and correct errors in the estimate parking map 300. For purposes of illustration and discussion, FIG. 4 shows the estimate parking map 300 extracted from the parking facility image 200 before correction.

The parking facility mapping system 100 (e.g., correction module 150) can detect clusters of neighboring parking spaces in the estimate parking map 300. Once a set of parking spaces are classified into a cluster, the system 100 (e.g., correction module 150) can label the cluster as a parking block by calculating a convex hull or an oriented bounding box that covers all the parking spaces within the same cluster.

To detect the clusters of neighboring parking spaces, in one or more embodiments the parking facility mapping system 100 (e.g., correction module 150) can apply a clustering algorithm to a set of estimate parking spaces in the estimate parking map 300 to identify parking blocks. For example, the clustering algorithm may be constructed such that parking spaces with one or more common characteristics or parking spaces that all have traits that satisfy one or more defined criteria are classified into the same cluster (i.e., parking block).

Figure 5:
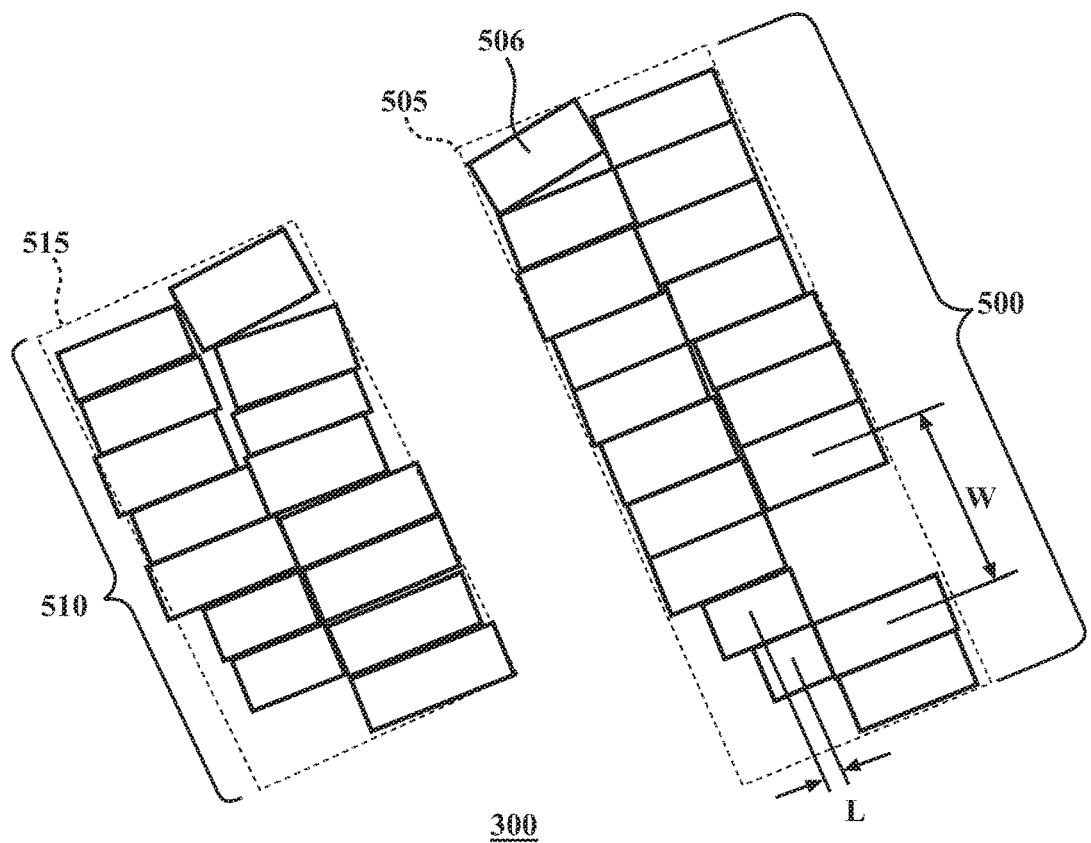
FIG. 5 illustrates an example estimate parking map with detected parking blocks enclosed in bounding boxes according to the disclosed subject matter.

In one or more embodiments, the clustering algorithm can include two or more parking spaces in a parking block based on a maximum difference in orientations of the parking spaces being less than a predefined threshold. For example, FIG. 5 shows the estimate parking map 300 with detected parking blocks 500, 510 enclosed in bounding boxes 505, 515. Although parking space 506 has an orientation that differs from the orientation of the other parking spaces in parking block 500, the difference in orientation may be less than a predefined threshold, e.g., 10 degrees, and is therefore included in the parking block 500.

In one or more embodiments, the clustering algorithm can identify "neighboring" parking spaces as a criteria for inclusion in a parking block. The criteria can require, for example, each parking space to be included in a parking block has at least one neighboring parking space within the same parking block.

In one or more embodiments, a pair of parking spaces can be considered to be neighboring if their lengthwise displacement (e.g., distance L) is less than a first threshold, and widthwise displacement (e.g., distance W) is less than a second threshold. In one or more implementations, the first threshold can be set to a distance less than the median length of parking spaces in the parking block when the parking block appears to have a single row of parking spaces and be set to a distance greater than the median length when the parking block appears to have two rows of back-to-back parking spaces. The second threshold can be set to a distance larger than the median length of parking spaces in the parking block so that parking spaces in the same parking block can be classified into the same cluster even if some of the parking spaces are missed by the parking space detection mechanisms.

Although the parking blocks 500, 510 include parking spaces aligned on an essentially straight line, some parking blocks may be situated along a curve. Accordingly, in one or more embodiments the clustering algorithm may be configured to include parking spaces in a parking block based on criteria that considers orientation. For example, sets of X number of parking spaces (e.g., 3 or 4) that have an orientation falling within a threshold difference of each other can be included in a parking group, or sets of X number of parking spaces that have an orientation falling with a threshold range of a median orientation value for a group of parking spaces can be included in a parking group.

In one or more embodiments, the parking facility mapping system 100 (e.g., correction module 150) can filter out clusters with a number of parking spaces below a threshold amount (e.g., 3 or 4) as noise. By removing such isolated candidate parking spaces, the system 100 may mitigate the impact of false positive detections of parking spaces.

The parking facility mapping system 100 (e.g., correction module 150) can correct errors in the geometrical features (e.g., position, shape, size, and orientation) of detected parking spaces within a parking block. Parking spaces in a same parking block typically exhibit one or more common geometric patterns. In one or more embodiments, the correction module 150 can include an algorithm that determines common geometric patterns by determining common size, shape and orientation of parking spaces within a parking block. For example, the correction module 150 can determine a median size, shape and orientation of parking spaces in the parking block. The correction module 150 can adjust the estimated parking spaces in a parking block based on the common geometric patterns. That is, in one or more embodiments, for each parking space in a parking block, the correction module 150 can determine whether geometric features of the parking space differ beyond a threshold amount from typical features of other parking spaces in the same parking block and correct the corresponding feature(s) such that they become more consistent with other spaces in the block.

In one or more embodiments, the correction module 150 can take into account additional information in making the corrections. For example, if map data are available, parking spaces in a parking block may be laid out along an adjacent road segment that borders the parking block, which can provide a reference line for the correction module 150 to utilize in determining a common geometric pattern. As another example, in parking facilities that include gaps between neighboring parking spaces, such gaps tend to be almost uniform within the same parking block. Thus, the correction module 150 can consider whether uniform gaps between neighboring parking spaces are a common geometric feature of a given parking block and apply corrections accordingly.

Figure 6:
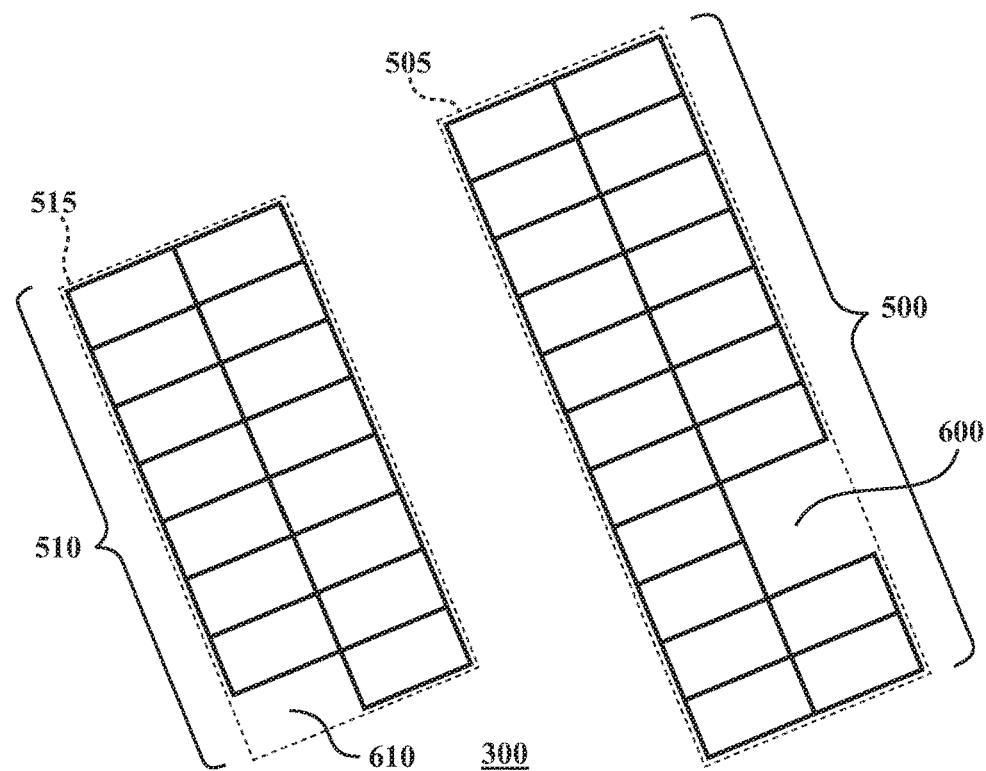
FIG. 6 illustrates an example estimate parking map with correction applied based on common geometric patterns according to the disclosed subject matter.

FIG. 6 shows the estimate parking map 300 with the corrections applied based on common geometric patterns. The shapes of the estimate parking spaces are now uniform and aligned. After the corrections, some gaps 600, 610, may remain in the estimate parking map 300. The correction module 150 can utilize the common geometric patterns of parking spaces within the same parking block to interpolate/extrapolate missing parking spaces to fill the gaps 600, 610.

In one or more embodiments, the correction module 150 can determine the size, shape, position and orientation of parking space(s) inserted into gaps 600, 610, which are created based on common geometric patterns of the respective parking blocks 500, 510. Furthermore, where the correction module 150 detects a gap that is significantly wider than the width of a parking space determined according to the common geometric pattern of the parking block (e.g., as in the case of gap 600), the correction module 150 can determine a number of parking spaces to be inserted in the gap that will allow each inserted parking space to be consistent with the geometric pattern. In one or more embodiments, the correction module 150 may use a machine learning algorithm, particle filter, or an optimization algorithm to find the most likely geometric parameters and positions of the inserted parking spaces.

Figure 7:
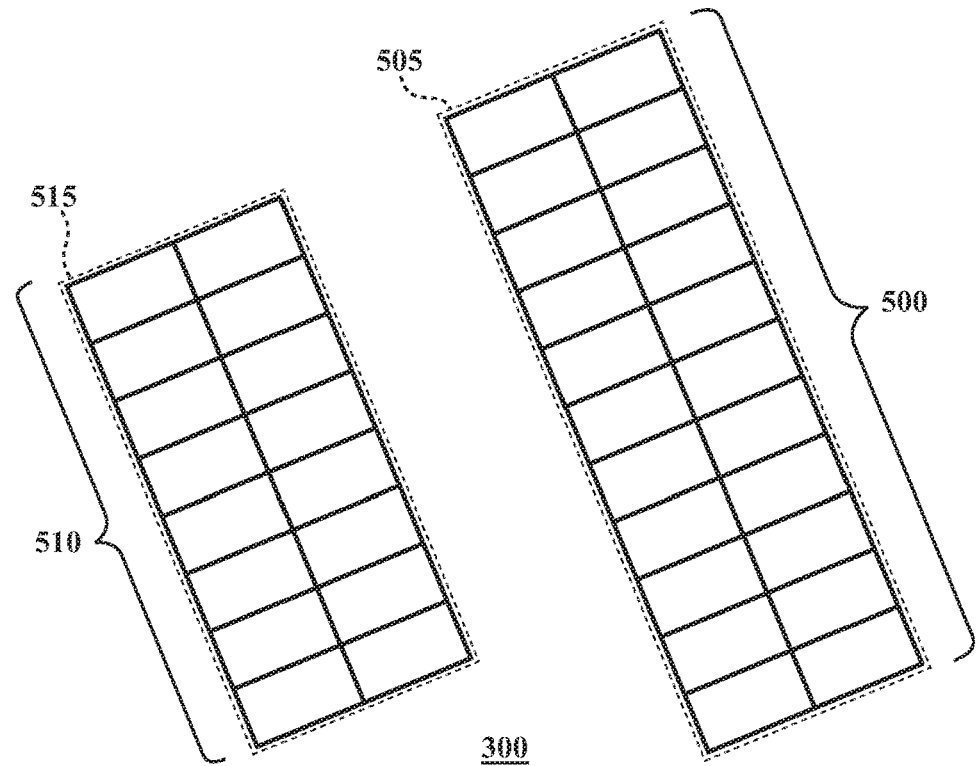
FIG. 7 illustrates an example estimated parking map with gaps filled by inserted parking spaces according to the disclosed subject matter.

FIG. 7 shows the estimated parking map 300 with gaps filled by inserted parking spaces consistent with the common geometric patterns of parking blocks 500, 510.

Figure 8:
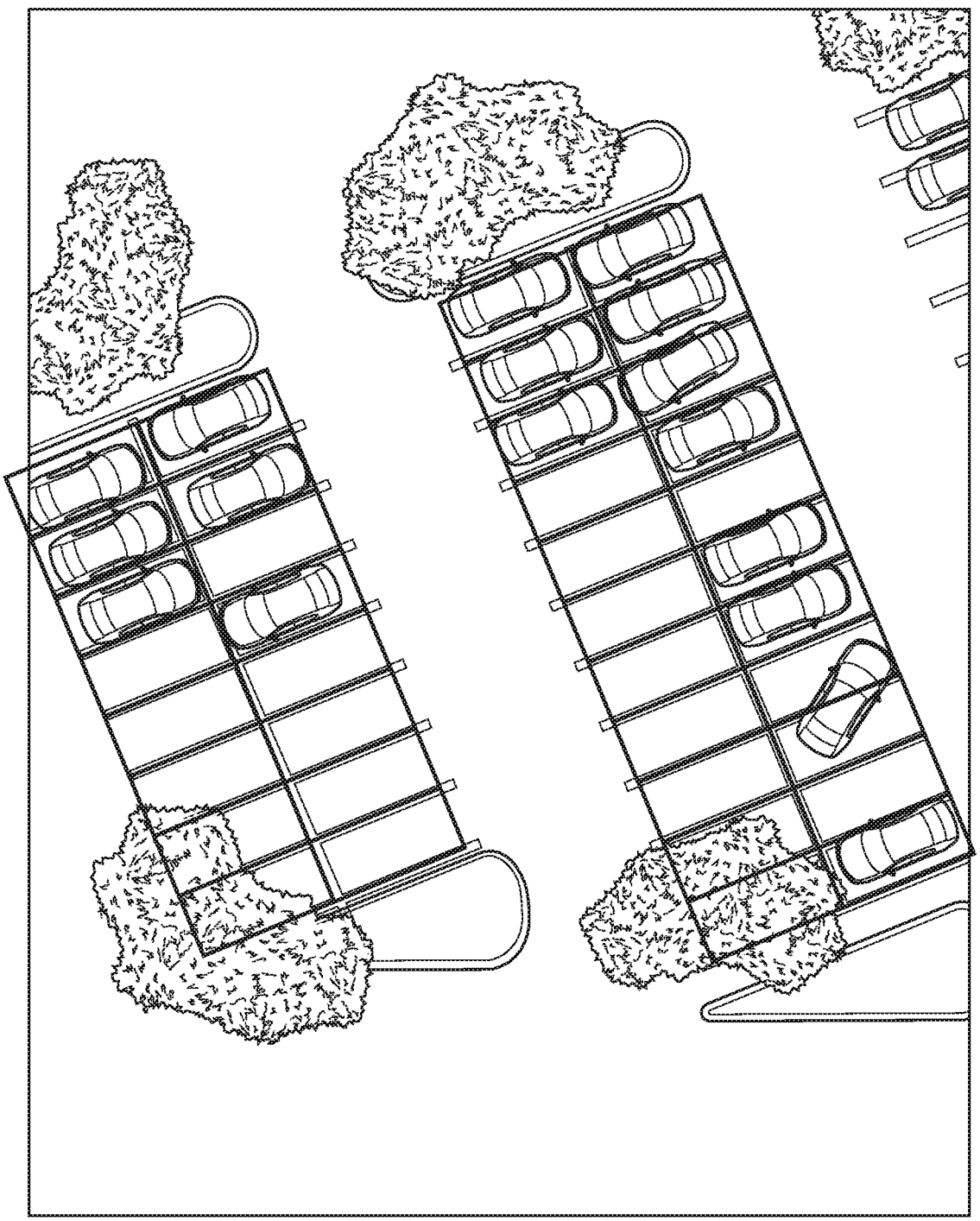
FIG. 8 illustrates an example corrected parking map according to the disclosed subject matter.

Referring to FIG. 8, with the corrections discussed above applied, the parking facility mapping system 100 (e.g., correction module 150) can automatically generate an accurate corrected parking map 800, despite the presence of occlusions and sensor noise present in the original image. Locations of parking spaces are accurately identified, even though parked cars and shadows deteriorated visibility of parking space lines.

Figure 9:
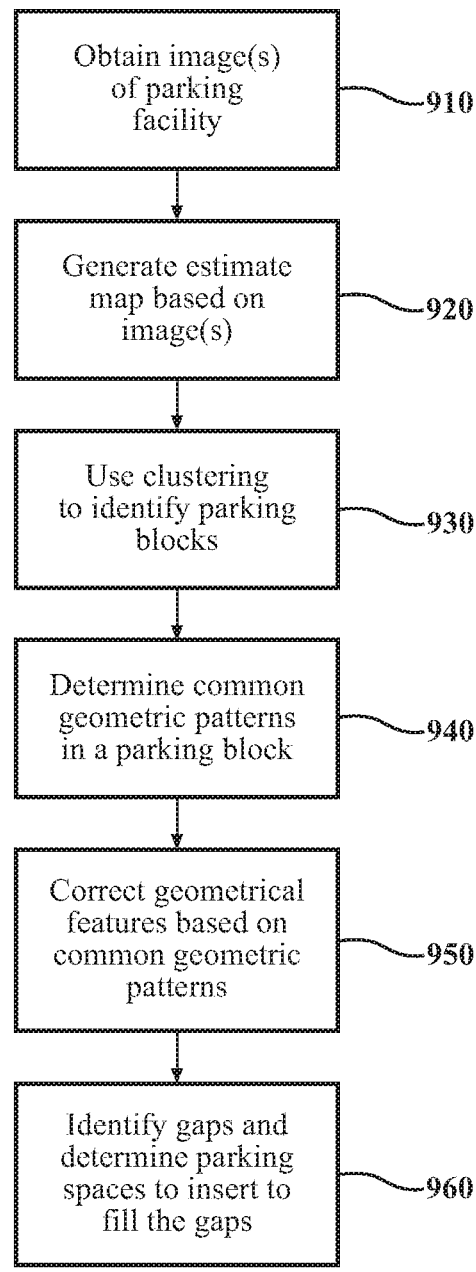
FIG. 9 illustrates a flow chart of a method of creating a parking map for a parking facility according to the disclosed subject matter.

FIG. 9 illustrates a flowchart of a method 900 that is associated with parking facility map creating operations of the disclosed parking facility mapping system 100. The method 900 will be discussed from the perspective of the disclosed parking facility mapping system 100 of FIG. 1. While the method 900 is discussed in combination with the system 100, it should be appreciated that the method 900 is not limited to being implemented within the system 100 but is merely one example of a system that may implement the method 900. Moreover, while the method 900 generally relates to creating a parking facility map, the method 900 illustrates a contextual overview of how the disclosed approaches may create a parking map for a parking facility.

At operation 910, the parking facility mapping system 100 (e.g., image module 130) obtains one or more images of a parking facility. In one or more embodiments the image module 130 can obtain the image(s) as one or more HD images from one or more sources, such as vehicles, satellite images, other external systems, etc. In one or more embodiments, the image(s) may be stored as image data 170 in the database 160 and the image module 130 may, when possible, perform operations such as stitching, cropping, joining, etc., to combine multiple images into a more complete image of the parking facility.

At operation 920, the parking facility mapping system 100 (e.g., estimate module 140) can generate an estimate map of parking spaces in the parking facility based at least on the image(s) of the parking facility. In one or more embodiments, the estimate map of parking spaces can include a plurality of estimate parking space shapes determined, for example, by image processing and analysis, machine learning algorithms trained to extract parking space lines, or other techniques.

Over operations 930-950, the parking facility mapping system 100 (e.g., correction module 150) executes one or more correction operations on the estimate map of parking spaces.

At operation 930, the correction module 150 can identify a parking block that includes a cluster of estimate parking spaces among the plurality of estimate parking space shapes. In one or more embodiments, the correction module 150 can execute a clustering algorithm that classifies estimate parking spaces as being a part of a same cluster based at least in part on a maximum difference in orientation angles of estimate parking spaces within the same cluster being less than a predefined threshold. In one or more embodiments, the correction module 150 can execute a clustering algorithm that classifies estimate parking spaces as being a part of a same cluster based at least in part on a maximum difference in median orientation angles of a set of X estimate parking spaces within the same cluster being less than a predefined threshold, where X is greater than 1. In one or more embodiments, the correction module 150 can execute a clustering algorithm that classifies estimate parking spaces as being a part of a same cluster based at least in part on each estimate parking space having at least one neighboring estimate parking space within the same cluster, where a neighboring estimate parking space has a lengthwise displacement less than a first threshold distance and a widthwise displacement less than a second threshold distance.

At operation 940, the correction module 150 can determine a common geometric pattern among the cluster of estimate parking spaces and correct geometrical features of one or more estimate parking spaces in the cluster of estimate parking spaces based at least in part on the common geometric pattern. In one or more embodiments, the correction module 150 can determine the common geometric pattern by determining median values for one or more of size, shape and orientation of the estimate parking spaces that form the cluster of estimate parking spaces.

At operation 950, the correction module 150 can correct geometrical features of one or more estimate parking spaces in the cluster of estimate parking spaces based at least in part on the common geometric patterns. For example, the correction module 150 can adjust the shape, size, or orientation of one or more estimate parking spaces as needed to bring the estimate parking spaces into consistent conformity with the common geometric patterns.

At operation 960, the correction module 150 can identify one or more gaps among the cluster of estimate parking space shapes in the estimate map and determine a number of inserted parking spaces to fill the one or more gaps based at least in part on the common geometric pattern. In one or more embodiments, the correction module 150 can identify one or more gaps among the cluster of estimate parking spaces by calculating a bounding box that encompasses the cluster of estimate parking space shapes and identifying a space within the bounding box that has a width greater than a threshold amount. In one or more embodiments, the correction module 150 can determine a number of parking spaces to insert into a detected gap based at least in part on the common geometric patterns of parking spaces within the bounding box.

Thus, the disclosed parking facility mapping system 100 can create a corrected map of parking spaces of the parking facility with increased accuracy while mitigating against errors that can be caused by occlusions, noise, etc., that may be present in an image of the parking facility.

In addition to the above-described configurations, it should be appreciated that the parking facility mapping system 100 from FIG. 1 can be configured in various arrangements with separate integrated circuits and/or chips. In such embodiments, the image module 130, estimate module 140 and correction module 150 can each be embodied on individual integrated circuits. The circuits can be connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130, 140 and 150 may be combined into a separate application-specific integrated circuit. In further embodiments, portions of the functionality associated with the modules 130, 140 and 150 may be embodied as firmware executable by a processor and stored in a non-transitory memory. In still further embodiments, the modules 130, 140 and 150 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., method 900 of FIG. 9) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The parking facility mapping system 100 can include one or more processors 110. In one or more arrangements, the processor(s) 110 can be a main processor of the parking facility mapping system 100. For instance, the processor(s) 110 can be an electronic control unit (ECU). The parking facility mapping system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A parking facility mapping system, comprising
one or more processors; and
a memory communicably connected to the one or more processors and storing:
an image module including one or more instructions that, when executed by the one or more processors, cause the one or more processors to obtain one or more images of a parking facility;
an estimate module including one or more instructions that, when executed by the one or more processors, cause the one or more processors to generate an estimate map of parking spaces in the parking facility based at least on the one or more images, the estimate map of parking spaces including a plurality of estimate parking space shapes; and
a correction module including one or more instructions that, when executed by the one or more processors, cause the one or more processors to identify a parking block that includes a cluster of estimate parking spaces among the plurality of estimate parking space shapes, determine a common geometric pattern among the cluster of estimate parking spaces, correct geometrical features of one or more estimate parking spaces in the cluster of estimate parking spaces based at least in part on the common geometric pattern, identify one or more gaps among the cluster of estimate parking spaces, and determine a number of inserted parking spaces to fill the one or more gaps based at least in part on the common geometric pattern to create a corrected map of parking spaces of the parking facility.

2. The parking facility mapping system of claim 1, wherein, the correction module further includes instructions to identify the parking block by executing a clustering algorithm that classifies estimate parking spaces as being a part of a same cluster based at least in part on a maximum difference in orientation angles of estimate parking spaces within the same cluster being less than a predefined threshold.

3. The parking facility mapping system of claim 1, wherein, the correction module further includes instructions to identify the parking block by executing a clustering algorithm that classifies estimate parking spaces as being a part of a same cluster based at least in part on a maximum difference in median orientation angles of a set of X estimate parking spaces within the same cluster being less than a predefined threshold, where X is greater than 1.

4. The parking facility mapping system of claim 1, wherein the correction module further includes instructions to identify the parking block by executing a clustering algorithm that classifies estimate parking spaces as being a part of a same cluster based at least in part on each estimate parking space having at least one neighboring estimate parking space within the same cluster, where a neighboring estimate parking space has a lengthwise displacement less than a first threshold distance and a widthwise displacement less than a second threshold distance.

5. The parking facility mapping system of claim 4, wherein the first threshold distance is less than a median length of the estimate parking spaces that form the cluster of estimate parking spaces and the second threshold distance is greater than a median width of the estimate parking spaces that form the cluster of estimate parking spaces.

6. The parking facility mapping system of claim 1, wherein the instructions to determine the common geometric pattern among the cluster of estimate parking spaces comprise instructions to determine median values for size, shape and orientation of the estimate parking spaces that form the cluster of estimate parking spaces.

7. The parking facility mapping system of claim 1, wherein the instructions to identify the one or more gaps among the cluster of estimate parking spaces comprise:
instructions to calculate a bounding box that encompasses the cluster of estimate parking spaces; and
instructions to identify a space within the bounding box that has a width greater than a threshold amount.

8. A method of creating a parking facility map, comprising:
obtaining one or more images of a parking facility;
generating an estimate map of parking spaces in the parking facility based at least on the one or more images, the estimate map of parking spaces including a plurality of estimate parking space shapes;
identifying a parking block that includes a cluster of estimate parking spaces among the plurality of estimate parking space shapes;
determining a common geometric pattern among the cluster of estimate parking spaces;
correcting geometrical features of one or more estimate parking spaces in the cluster of estimate parking spaces based at least in part on the common geometric pattern;
identifying one or more gaps among the cluster of estimate parking spaces; and
determining a number of inserted parking spaces to fill the one or more gaps based at least in part on the common geometric pattern.

9. The method of claim 8, wherein the identifying the parking block comprises executing a clustering algorithm that classifies estimate parking spaces as being a part of a same cluster based at least in part on a maximum difference in orientation angles of estimate parking spaces within the same cluster being less than a predefined threshold.

10. The method of claim 8, wherein the identifying the parking block comprises executing a clustering algorithm that classifies estimate parking spaces as being a part of a same cluster based at least in part on a maximum difference in median orientation angles of a set of X estimate parking spaces within the same cluster being less than a predefined threshold, where X is greater than 1.

11. The method of claim 8, wherein the identifying the parking block comprises executing a clustering algorithm that classifies estimate parking spaces as being a part of a same cluster based at least in part on each estimate parking space having at least one neighboring estimate parking space within the same cluster, where a neighboring estimate parking space has a lengthwise displacement less than a first threshold distance and a widthwise displacement less than a second threshold distance.

12. The method of claim 11, wherein the first threshold distance is less than a median length of the estimate parking spaces that form the cluster of estimate parking spaces and the second threshold distance is greater than a median width of the estimate parking spaces that form the cluster of estimate parking spaces.

13. The method of claim 8, wherein the determining the common geometric pattern among the cluster of estimate parking spaces comprises determining median values for size, shape and orientation of the estimate parking spaces that form the cluster of estimate parking spaces.

14. The method of claim 8, wherein the identifying one or more gaps among the cluster of estimate parking spaces comprises:
calculating a bounding box that encompasses the cluster of estimate parking spaces; and
identifying a space within the bounding box that has a width greater than a threshold amount.

15. A non-transitory computer-readable medium for creating a parking facility map and including instructions that when executed by one or more processors cause the one or more processors to:
obtain one or more images of a parking facility;
generate an estimate map of parking spaces in the parking facility based at least on the one or more images, the estimate map of parking spaces including a plurality of estimate parking space shapes;
identify a parking block that includes a cluster of estimate parking spaces among the plurality of estimate parking space shapes;
determine a common geometric pattern among the cluster of estimate parking spaces;
correct geometrical features of one or more estimate parking spaces in the cluster of estimate parking spaces based at least in part on the common geometric pattern;
identify one or more gaps among the cluster of estimate parking spaces; and determine a number of inserted parking spaces to fill the one or more gaps based at least in part on the common geometric pattern.

16. The non-transitory computer-readable medium of claim 15, wherein the instructions to identify the parking block comprise instructions to execute a clustering algorithm that classifies estimate parking spaces as being a part of a same cluster based at least in part on a maximum difference in orientation angles of estimate parking spaces within the same cluster being less than a predefined threshold.

17. The non-transitory computer-readable medium of claim 15, wherein the instructions to identify the parking block comprise instructions to execute a clustering algorithm that classifies estimate parking spaces as being a part of a same cluster based at least in part on a maximum difference in median orientation angles of a set of X estimate parking spaces within the same cluster being less than a predefined threshold, where X is greater than 1.

18. The non-transitory computer-readable medium of claim 15, wherein the instructions to identify the parking block comprise instructions to execute a clustering algorithm that classifies estimate parking spaces as being a part of a same cluster based at least in part on each estimate parking space having at least one neighboring estimate parking space within the same cluster, where a neighboring estimate parking space has a lengthwise displacement less than a first threshold distance and a widthwise displacement less than a second threshold distance.

19. The non-transitory computer-readable medium of claim 18, wherein the first threshold distance is less than a median length of the estimate parking spaces that form the cluster of estimate parking spaces and the second threshold distance is greater than a median width of the estimate parking spaces that form the cluster of estimate parking spaces.

20. The non-transitory computer-readable medium of claim 15, wherein the instructions to determine the common geometric pattern among the cluster of estimate parking spaces comprise instructions to determine median values for size, shape and orientation of the estimate parking spaces that form the cluster of estimate parking spaces.

* * * * *